(12) United States Patent
Mueller et al.

(10) Patent No.: US 11,629,658 B2
(45) Date of Patent: Apr. 18, 2023

(54) METHOD FOR ACTIVATING A BOOST PRESSURE CONTROL

(71) Applicant: Volkswagen Aktiengesellschaft, Wolfsburg (DE)

(72) Inventors: Sven Mueller, Hannover (DE); Tobias Noesselt, Hannover (DE); Mauro Calabria, Peine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/845,604

(22) Filed: Jun. 21, 2022

(65) Prior Publication Data

US 2022/0403792 A1 Dec. 22, 2022

(30) Foreign Application Priority Data

Jun. 22, 2021 (DE) ...................... 10 2021 206 418.3

(51) Int. Cl.
*F02D 41/00* (2006.01)
*F02B 37/22* (2006.01)

(52) U.S. Cl.
CPC .......... *F02D 41/0007* (2013.01); *F02B 37/22* (2013.01)

(58) Field of Classification Search
CPC .. F02D 41/0007; F02D 41/18; F02D 41/1448; F02D 2200/0406; F02D 23/00; F02B 37/22; Y02T 10/12; Y02T 10/40
See application file for complete search history.

(56) References Cited

U.S. PATENT DOCUMENTS

| | | | |
|---|---|---|---|
| 6,170,469 B1 * | 1/2001 | Itoyama | F02D 41/0007 123/480 |
| 8,156,925 B2 * | 4/2012 | Tabata | F02D 41/0007 123/568.21 |
| 9,297,325 B2 * | 3/2016 | Sujan | F02D 41/0007 |
| 10,876,468 B2 | 12/2020 | Huebner et al. | |
| 11,015,538 B2 | 5/2021 | Gebauer et al. | |

(Continued)

FOREIGN PATENT DOCUMENTS

| | | |
|---|---|---|
| DE | 102007058618 A1 | 6/2008 |
| DE | 102007025077 A1 | 12/2008 |
| DE | 102017213068 A1 | 1/2019 |

(Continued)

*Primary Examiner* — Audrey B. Walter
*Assistant Examiner* — Dapinder Singh
(74) *Attorney, Agent, or Firm* — Muncy, Geissler, Olds & Lowe, P.C.

(57) ABSTRACT

A method for activating a boost pressure control for an internal combustion engine, which contains, in a through-flow direction, a compressor, a charge air line, a throttle valve, an intake manifold, at least one combustion chamber and a turbine speed-coupled to the compressor, an aperture of the throttle valve being controllable, a driving of the turbine being controllable by an exhaust gas flow, and the method including: predefining a setpoint intake manifold pressure; calculating a simplified inverse flow characteristic of the throttle valve; calculating a pseudo setpoint aperture of the throttle valve, based on the simplified inverse flow characteristic and the setpoint intake manifold pressure; and controlling the driving of the turbine, based on an exceeding of a maximum aperture of the throttle valve by the pseudo setpoint aperture of the throttle valve.

9 Claims, 5 Drawing Sheets

(56) References Cited

U.S. PATENT DOCUMENTS

| 11,098,640 B2 | 8/2021 | Heinken |
| 2015/0219024 A1* | 8/2015 | Kurashima ............ F02D 23/00 123/321 |

FOREIGN PATENT DOCUMENTS

| DE | 102017213497 A1 | 2/2019 |
| DE | 102018211538 A1 | 1/2020 |
| DE | 102018220094 A1 | 5/2020 |

* cited by examiner

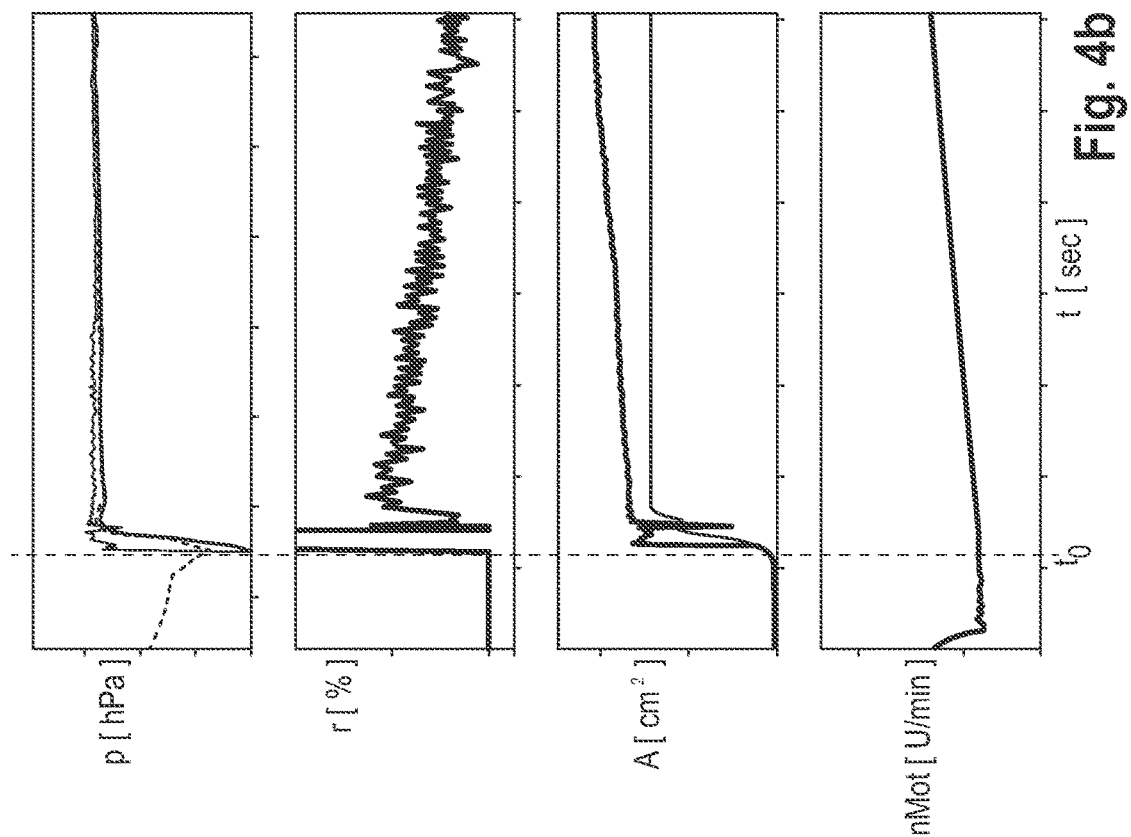
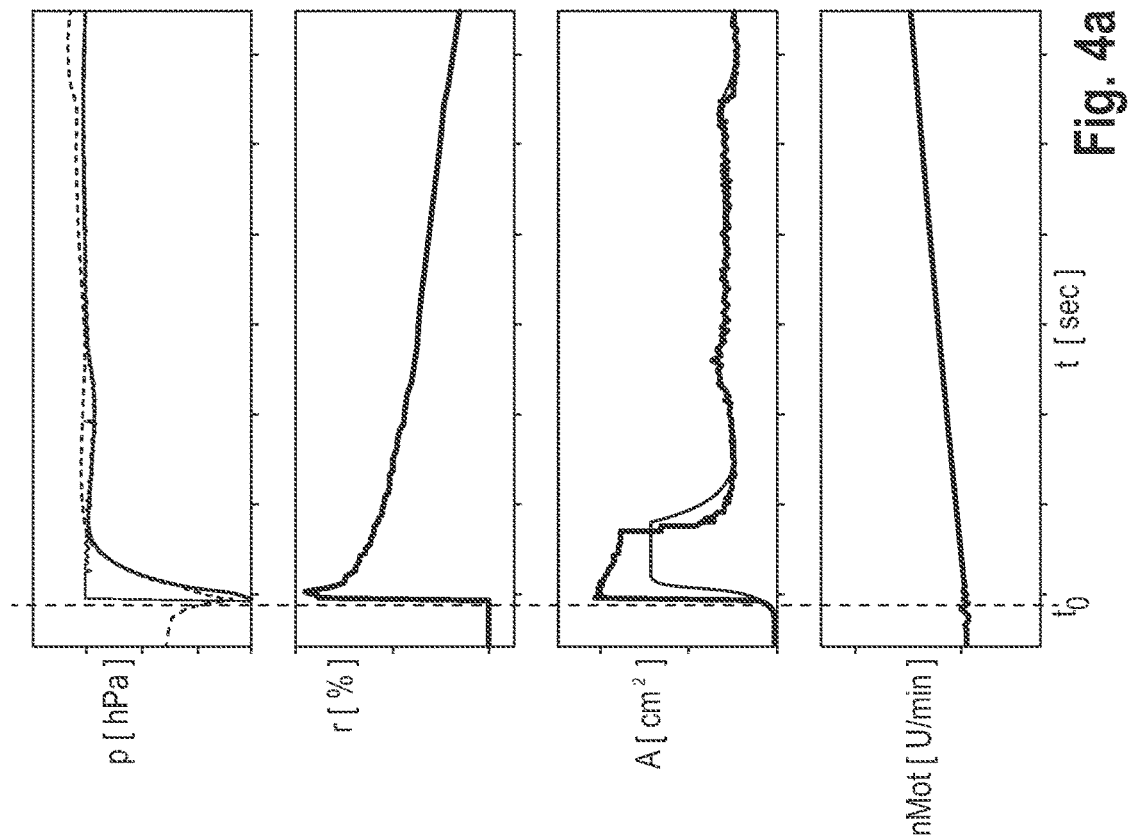

METHOD FOR ACTIVATING A BOOST PRESSURE CONTROL

This nonprovisional application claims priority under 35 U.S.C. § 119(a) to German Patent Application No. 10 2021 206 418.3, which was filed in Germany on Jun. 22, 2021, and which is herein incorporated by reference.

BACKGROUND OF THE INVENTION

Field of the Invention

The present invention relates to a method for activating a boost pressure control, a method for controlling a throttle valve, a computer program product, a storage medium, a control unit, a rechargeable internal combustion engine, and a motor vehicle.

In particular, the invention relates to a method for activating a boost pressure control for an internal combustion engine, which contains, in a through-flow direction, a compressor, a charge air line, a throttle valve, an intake manifold, at least one combustion chamber and a turbine speed-coupled to the compressor, an aperture of the throttle valve being controllable, a driving of the turbine being controllable by an exhaust gas flow, and the method including: predefining a setpoint intake manifold pressure.

Description of the Background Art

A rechargeable internal combustion engine may be configured in such a way that a compressor, a charge air line, a throttle valve, an intake manifold, a combustion chamber and a turbine speed-coupled with the compressor are present in a through-flow direction. The internal combustion engine usually contains an engine control unit, which converts a torque demand into a setpoint intake manifold pressure. The throttle valve is controllable, so that an aperture of the throttle valve is adjustable. The turbocharger is also controllable, for example, in that a short-circuit ("waste gate" in technical terms) and/or a variable blade geometry (also referred to as a variable turbine geometry, or VTG for short) is/are controlled. A driving of the turbine is thus varied by the exhaust gas, so that a compressor rotational speed may be controlled in a targeted manner. All common turbocharger controllers share the fact that the turbine always runs in combustion mode, and the compressor thus supplies an at least small pressure increase. This minimal pressure at least slightly higher than an ambient pressure in the charge air line is referred to as the "basic boost pressure", and it is variable, depending on the operating state.

As long as the setpoint intake manifold pressure is below the basic boost pressure, minus a throttling loss, the torque demand may be met by only opening the throttle valve without activating the turbocharger, i.e. by enlarging an aperture of the throttle valve opening. Because the throttle valve also has a throttling effect with the largest aperture, a switchover from a throttle valve control to a boost pressure control usually occurs shortly before the setpoint intake manifold pressure reaches the basic boost pressure.

In practice, a precise determination of this switchover results in the following problems, for example, due to component variation and an insufficient quality of the underlying basic boost pressure module. Firstly, the turbocharger may be activated too early, so that an actual boost pressure is greater than the setpoint intake manifold pressure. This pressure difference is achieved by reducing the size of the aperture of the throttle valve, so that the turbocharger ultimately generates an unnecessarily high exhaust gas back-pressure, so that a consumption of the internal combustion engine is unnecessarily high. Secondly, if the boost pressure control is activated too late, the internal combustion engine does not supply the requested torque or supplies it noticeably too late. The "boost pressure" is the pressure in the charge air line upstream from the throttle valve.

A basic boost pressure model usable for this purpose is described, for example, in the generic DE 10 2017 213 497 A1, which corresponds to US 2020/0173346, which is incorporated herein by reference, namely a method for determining a basic boost pressure depending on an exhaust gas back-pressure.

The basic boost pressure model may be combined with a hysteresis threshold to avoid too early an activation of the boost pressure control. Control methods are known from the prior art to nevertheless quickly reach a setpoint boost pressure. For example, DE 10 2017 213 068 A1 describes a method for adapting a cross-sectional area of a turbocharger to achieve a setpoint acceleration of the turbocharger for the purpose of rapidly reaching a setpoint boost pressure.

SUMMARY OF THE INVENTION

It is therefore an object of the present invention to provide a method for activating a boost pressure control, which at least partially overcomes the disadvantages specified above.

In an exemplary embodiment, a method is provided for activating a boost pressure control for an internal combustion engine, which contains, in a through-flow direction, a compressor, a charge air line, a throttle valve, an intake manifold, a combustion chamber and a turbine speed-coupled with the compressor, an aperture of the throttle valve being controllable, a driving of the turbine being controllable by an exhaust gas flow. The method includes: predefining a setpoint intake manifold pressure; calculating a simplified inverse flow characteristic of the throttle valve; calculating a pseudo setpoint aperture of the throttle valve, based on the simplified inverse flow characteristic and the setpoint intake manifold pressure; and controlling the driving of the turbine, based on an exceeding of a maximum aperture of the throttle valve by the pseudo setpoint aperture of the throttle valve.

The method according to the invention for controlling a throttle valve opening includes, on the one hand, the method according to the invention for activating the boost pressure control and includes, on the other hand: controlling the aperture of the throttle valve, based on the setpoint intake manifold pressure, including: limiting the control response to the maximum aperture.

The computer program product according to the invention is adapted to be able to carry out at least the method according to the invention for activating a boost pressure control.

The storage medium according to the present invention contains the computer program according to the present invention.

The control unit according to the invention is communicatively connectable to a throttle valve drive and a turbocharger drive, and carries out at least the method according to the invention for activating a boost pressure control.

The rechargeable internal combustion engine according to the invention contains a compressor, a charge air line, a throttle valve, an intake manifold, a combustion chamber, a turbine speed-coupled to the compressor and a control unit according to the invention in a through-flow direction, an aperture of the throttle valve being controllable with the aid of the control unit and a driving of the turbine being controllable by an exhaust gas flow.

The vehicle according to the invention contains the internal combustion engine according to the invention.

The method according to the invention relates to an activation of a boost pressure control for an internal combustion engine, which, in a direction in which air flows through the internal combustion engine, contains, in this order, a compressor, a charge air line, a throttle valve, an intake manifold, at least one combustion chamber and a turbine speed-coupled with the compressor to form a turbocharger.

The internal combustion engine may also contain further elements, for example, an induction system, a filter and/or a clean air line, which may be connected upstream from the compressor. In addition, a compressor, which is speed-coupled with an output shaft of the internal combustion engine, and/or an electromotively operable compressor may be connected in parallel to the compressor or be connected upstream or downstream from the compressor. The internal combustion engine may contain a charge air cooler. The turbine is speed-coupled with the compressor to form a turbocharger. The turbocharger or a further compressor may be optionally electromotively drivable. At least one exhaust gas aftertreatment element, such as a catalytic converter, is usually connected downstream from the turbine. In addition, an exhaust gas recirculation system may be arranged, with the ability to be short-circuited, for example, between a manifold connected downstream from the combustion chamber and the charge air line and/or arranged, with the ability to be short circuited, between an exhaust gas line connected downstream from the turbine and the clean air line. These are only frequent options. Many other combinable options in internal combustion engine manufacturing also exist. The method according to the invention is adaptable to all options combinable in this way.

An aperture of the throttle valve is controllable. For this purpose, for example, an actuator may move the aperture between a minimum aperture and a maximum aperture in the direction of a control signal. In case of doubt, the term "control" in this description is always to include "feedback-control" or "regulate."

A driving of the turbine by an exhaust gas flow from the at least one combustion chamber is controllable. The driving may be implemented, for example, as a wastegate and/or a turbine having a variable turbine geometry, known as VTG. The "driving" here designates a measurement, in which the turbine is subjected to a torque due to the exhaust gas flow.

An "activation" of the boost pressure control can be understood in a broad sense as a change of a control signal output in the direction of a non-minimal driving. The term "activating" thus contains both a startup of the boost pressure control as well as a re-output of a signal which is changed only in terms of absolute value.

The method according to the invention includes a predefinition of a setpoint intake manifold pressure. This pressure may be ascertained, for example, by an engine control unit or the like, based on an engine characteristic map, in particular based on the engine characteristic map and a torque demand.

The method according to the present invention further includes the steps: calculating a simplified inverse flow characteristic of the throttle valve; calculating a pseudo setpoint aperture of the throttle valve, based on the simplified inverse flow characteristic and the setpoint intake manifold pressure; and controlling the driving of the turbine, based on an exceeding of a maximum aperture of the throttle valve by the pseudo setpoint aperture of the throttle valve.

The inverse flow characteristic is a predefined characteristic or a characteristic which is predefinable by the construction of the throttle valve and natural laws. By means of its simplification, the throttling behavior in the transition region between throttle control and boost pressure control may be determined in a stable manner. The pseudo setpoint aperture in the transition region may thus be calculated. The pseudo aperture is therefore an improvement over known control methods.

In an example, it is assumed that a torque demand for the internal combustion engine always continues to increase. In this example, a conventional control with a basic boost pressure model is used until the basic boost pressure is reached. When the setpoint intake manifold pressure reaches the basic boost pressure, a switchover from one controller to another controller is conventionally made. In contrast, according to the invention, the pseudo setpoint aperture in this example is used as the criterion for the driving. Because the new boost pressure control depends on the aperture, increasing the boost pressure prior to the complete opening of the throttle is now avoided. In that the excessively early boost pressure is eliminated, the unnecessarily high exhaust gas back-pressure associated therewith is also eliminated. The method according to the invention thus ultimately results in fuel savings. As a result, a robust method for controlling boost pressure is obtained.

The inverse flow characteristic may be simplified with the aid of a Taylor series expansion in a working point. Due to the series expansion, a hard-to-handle inverse flow characteristic, which in the specific case may depend on many variable parameters, is converted, for example, into a power series, which may depend, for example, on only one parameter or only two or three parameters. The Taylor series expansion may preferably be truncated to a quadratic function after the third term at the latest. It is more preferable to truncate the Taylor series expansion to a linear function after the second term. A geometric algorithm having a tangent approximation may also be used for the purpose of linearization.

It is also preferred for the purpose of efficient reuse, independently of the algorithm used, to simplify the inverse flow characteristic by converting it into a quadratic function or by linearizing it, i.e., converting it into a linear function.

Because the flow characteristic depends on many operating parameters, it is not stationary. According to an example, the simplification of the inverse flow characteristic is calculated during operation. For example, the simplification may be continuously recalculated. According to another option, the simplification is recalculated periodically, for example, ever half-second. According to yet another option, a change of the input parameters is monitored, and the simplification is corrected as soon as at least one of the input parameters exceeds a minimum change. According to another option, the method includes a precalculation of a multiplicity of simplifications, based on different parameter values and a selection of one simplification from the multiplicity of simplifications. The selection may be based, for example, on a parameter comparison. In case of doubt, a "multiplicity" is to be "at least two."

Studies within the scope of the invention have shown advantageous operating points. A working point, for which the inverse flow characteristic is simplified, is preferably selected in such a way that a quotient of the intake manifold pressure in relation to boost pressure is in a range from 0.90 to 0.995. A "range from . . . to . . . " includes the key points.

These values have the following technical background: If the inverse flow characteristic of the throttle valve is plotted over a coefficient of the intake manifold pressure and charge air line pressure, it may correspond to a hyperbola. If the quotient is at least 0.90, the slope of the inverse flow characteristic is, according to experience, not too flat for a significant change, corresponding to a change of the quotient, of the pseudo setpoint through-flow area calculated therefrom. In other words, the calculation of the pseudo setpoint through-flow area is sufficiently sensitive, if the intake manifold pressure is at least 0.9 times the charge air line pressure. If the quotient is more than approximately 0.995, the slope of the inverse flow characteristic may be, according to experience, too steep for a stable change, corresponding to a change of the quotient, of the pseudo setpoint through-flow area calculated therefrom. In other words, the calculation of the pseudo setpoint through-flow area is too sensitive, if the intake manifold pressure is more than 0.995 times the charge air line pressure.

A more flexible controller behavior has been demonstrated if the quotient is in a range from 0.95 to 0.995. An even more flexible controller behavior resulted when quotient was in a range from 0.97 to 0.99. In the tests on which this invention was based, the best controller behavior was demonstrated at a working point, whose intake manifold pressure was at least 0.98 times the boost pressure. These values are subject to a technically typical tolerance, for example +/−5%.

The method according to the invention is applicable to any rechargeable internal combustion engine, for example a vehicle drive, in particular a motorcycle drive, automobile drive or truck drive, as well as to an aircraft drive or a boot drive, and also to an internal combustion engine operated in a stationary manner, such as a ship drive, an emergency engine, a power plant motor and/or a generating set for decentralized combined heat and power generation. Common to most of these scenarios is the fact that a comparatively small control unit is used for controlling the internal combustion engine. To save computing time, specific embodiments may disregard one of the following circumstances: For example, an intake manifold dynamic may be mathematically disregarded when calculating the pseudo setpoint aperture. Additionally or alternatively, a tank venting mass flow may be mathematically disregarded when calculating the pseudo setpoint aperture. Additionally or alternatively, a tolerance-induced and/or wear-induced throttle valve leak may be mathematically disregarded when calculating the pseudo setpoint aperture.

According to a further option, the following formula may be used when calculating the pseudo setpoint aperture:

$$\tilde{A}_{DK,soll} = \frac{w_{vlv,soll}}{\sqrt{\frac{2}{RT_1} p_{vd}}} \left( a + b \frac{p_{sr,soll}}{p_{vd}} \right)$$

Where the following mean:
$\tilde{A}_{DK,soll}$ the pseudo setpoint aperture;
$w_{vlv,soll}$ a setpoint mass flow in the combustion chamber(s);
R the gas constant of the air;
$T_1$ a temperature upstream from the throttle valve;
a constant from the linearization of the inverse throttle characteristic;
b constant from the linearization of the inverse throttle characteristic;
$p_{sr,soll}$ the setpoint intake manifold pressure; and
$p_{vd}$ the boost pressure.

Of course, a different simplification of the inverse flow characteristic may be used instead of the term $(a+b*p_{sr,soll}/p_{vd})$.

According to a further option, the exceeding of the maximum aperture of the throttle valve by the pseudo setpoint aperture of the throttle valve may be calculated by calculating a difference from the maximum aperture and the pseudo setpoint aperture. This option thus involves a simple subtraction and is therefore very fast and efficient to implement. A further option for determining the exceeding may include in this order: determining whether the pseudo setpoint aperture of the throttle valve is greater by an absolute value than the maximum aperture of the throttle valve, and driving with the aid of a calculated control value if positive and/or driving with the aid of a minimal control value if negative. The "minimum control value" is to be understood to be a value for driving the turbine, which is selected according to a minimum turbine power.

Some control terms have the characteristic of continuously increasing the output signal in the case of an input signal which is continuously other than zero. This behavior is undesirable. If the exceeding is calculated by only one difference, the following may therefore be additionally provided: limiting a control variable in the case that the pseudo setpoint aperture is smaller than the maximum aperture. This option represents only one preferred option of an "anti-windup concept." Alternatively or additionally, another signal drift prevention algorithm may therefore be advantageously provided.

The method according to the invention for activating a boost pressure control may be included in a method for controlling a throttle valve. In this way, a complete method for controlling the intake manifold pressure is obtained.

The method for controlling a throttle valve opening preferably includes controlling the aperture of the throttle valve, based on the setpoint intake manifold pressure. The same input variable of setpoint intake manifold pressure is thus entered in both method parts, for controlling the throttle valve, on the one hand, and for controlling the boost pressure, on the other hand. This results in a particularly high correspondence of the two method parts in the transition region, so that a multiple consumption, in particular, is reduced.

To reduce a susceptibility to errors, this may include as a refinement: limiting the control response to the maximum aperture.

The advantages of the method for activating a boost pressure control or the method for controlling a throttle valve, including the method for activating a boost pressure control, may be implemented with the aid of the computer program product according to the invention, which is adapted for the purpose of carrying out the method according to the invention. For example, the method according to the invention may be contained in the computer program product as a function or a module. The same applies to a storage medium, on which the computer program product according to the invention is contained. This storage medium may be, for example, a data carrier, which is configured and/or written to be read out by a control unit programming device. The storage medium may furthermore be an electronic component, such as a memory card or memory module, which is configured to be used, for example, in a circuit of a control unit and/or in a reader connected to a control unit.

A control unit according to the invention may be communicatively connectable to a turbocharger drive. A control unit according to the invention may also be communicatively connectable to a turbocharger drive and to a throttle valve drive. The control unit according to the invention furthermore contains: a component for carrying out the method according to the invention. This component can contain, for example, a communication unit for communicating with at least one sensor and/or at least one other control unit, a logic unit for calculation, and a communication unit for communicating with a drive unit.

An internal combustion engine according to the invention contains the elements described at the outside in a through-flow direction: a compressor, a charge air line, a throttle valve, an intake manifold, a combustion chamber, a turbine speed-coupled with the compressor, and a control unit. The aperture of the throttle valve and a drive of the turbine are controllable by an exhaust gas flow, as described at the outset. The control unit corresponds to the control unit according to the invention described above. The internal combustion engine according to the invention thus implements the advantages of the method according to the invention during operation.

Finally, the vehicle according to the invention contains the internal combustion engine according to the invention. The vehicle according to the invention thus implements the advantages of the method according to the invention during operation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4a shows multiple diagrams of a behavior of an internal combustion engine according to the conventional art;

FIG. 4b shows multiple diagrams, which correspond to the ones in FIG. 4a, of a behavior of the internal combustion engine according to the invention.

DETAILED DESCRIPTION

Figure 1:
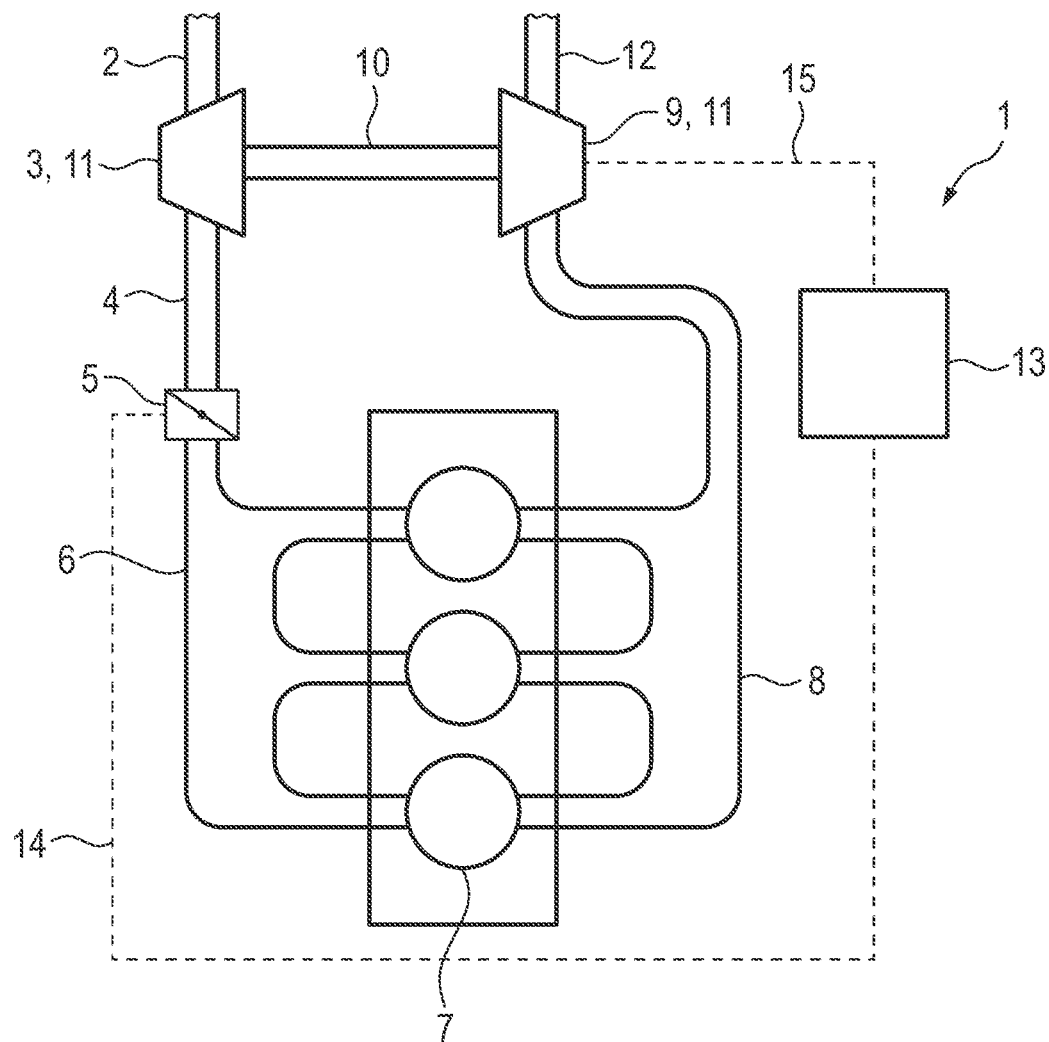
FIG. 1 schematically shows an internal combustion engine according to a first example.
Figure 2:
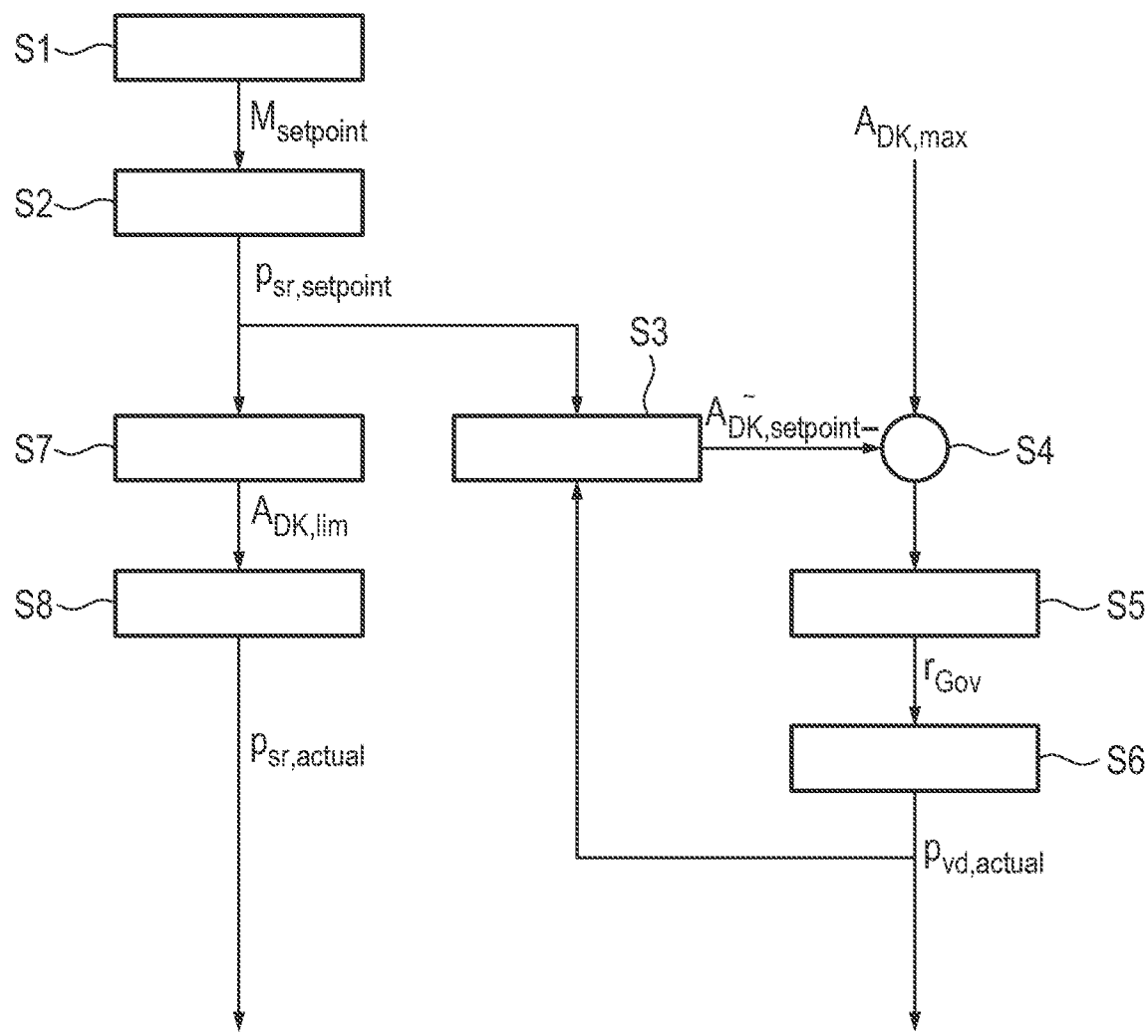
FIG. 2 shows a sequence of a method according to the invention according to the first example.

One exemplary embodiment of an internal combustion engine 1 according to the first example is described on the basis of FIG. 1. Internal combustion engine 1 contains an air intake line 2, which opens into a compressor 3. A charge air line 4 leads from compressor 3 to a throttle valve 5. An intake manifold 6 leads from throttle valve 5 to multiple cylinders. Each cylinder forms a combustion chamber 7 together with a cylinder head, which is not illustrated, valves, which are not illustrated, and a piston, which is not illustrated. A shared manifold 8 leads from combustion chambers 7 to a turbine 9. Turbine 9 is rotatably fixedly coupled with compressor 3 via a shaft 10 to form a turbocharger 11. An exhaust gas line 12 abuts turbine 9.

A control unit 13 is coupled with a throttle valve drive unit, which is not illustrated, of throttle valve 5 via a control line 14 for the purpose of transferring signals. Throttle valve 5 is adjustable, and it is pivoted by throttle valve drive unit according to the signals from control unit 13. An aperture of throttle valve 5 may thus be predefined by control unit 13.

Control unit 13 is coupled with a turbine drive unit, which is not illustrated, of turbine 9 via a control line 15 for the purpose of transferring signals. According to the first specific embodiment, turbine 9 in internal combustion engine 1 is a turbine having a variable turbine geometry, as is often used in spark-ignition engines. A signal from control unit 13 may thus set the turbine drive unit to the flow resistance of turbine 9. The flow resistance corresponds to the driving of turbine 9.

Among other things, steps of a method for activating a turbocharger controller and steps of a method for controlling a throttle valve, including the method for activating a turbocharger controller, run in control unit 13.

In a first step S1, a torque demand $M_{soll}$ is detected. For example, control unit 13 reads out an accelerator pedal travel sensor, or a driver assistance system reports a torque demand to control unit 13.

Requested torque $M_{soll}$ is converted into a requested intake manifold pressure $p_{sr,soll}$ in a step S2. An engine characteristic map, for example, is used for this purpose.

Requested intake manifold pressure $p_{sr,soll}$ is converted into a pseudo setpoint aperture $\tilde{A}_{DK,soll}$. A throttle equation is simplified for this purpose in step S3.

The background will be briefly discussed for a better understanding. The throttle equation may be solved for the throttle valve area and is then as follows:

$$A_{DK} = \frac{\frac{V}{\kappa RT_2} \dot{p}_{sr} + w_{vlv} - w_{TEV}}{\sqrt{\frac{2}{RT_1} p_{vd} \Psi(p_{sr}/p_{vd})}} - A_{DK,Leak}$$

Where the following mean:
$A_{DK}$ throttle valve area;
V intake manifold volume;
$\kappa$ specific heat of the air;
R gas constant of the air;
$T_2$ temperature in intake manifold 4;
pressure change in intake manifold 4;
$w_{vlv}$ mass flow in combustion chambers 7 (in technical terms: "over the valves");
$p_{sr}$ pressure in intake manifold 4;
$w_{TEV}$ tank venting mass flow;
$T_1$ temperature upstream from throttle 5;
$p_{vd}$ pressure upstream from throttle 5;
$\Psi$ throttle flow characteristic;
a coefficient; and
b coefficient.

Figure 3:
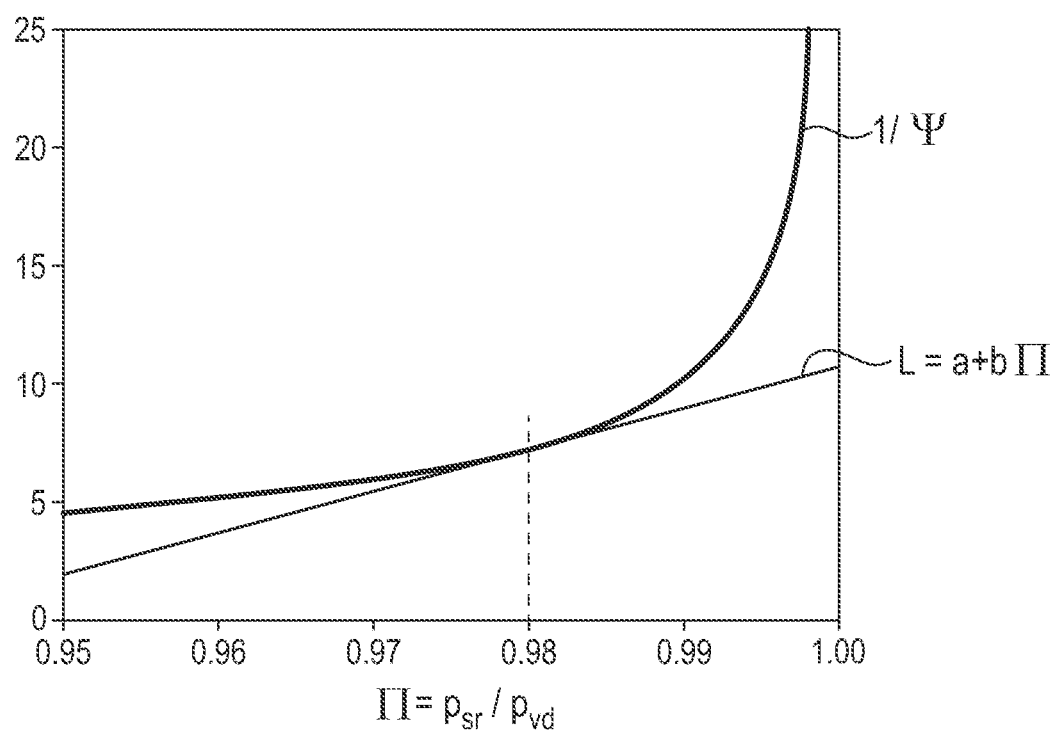
FIG. 3 shows a simplification during the method according to the first example.

To be able to reliably calculate inverse flow characteristic $1/\Psi(p_{sr}/p_{vd})$, the latter is simplified according to FIG. 3. In FIG. 3, hyperbolic function $1/\Psi$ is plotted over pressure ratio $\Pi=p_{sr}/p_{vd}$. In FIG. 3, a working point is indicated by a dashed line at $\Pi=0.98$. In this working point, inverse flow characteristic 1/Ψ is linearized to a straight line L. In the working point, straight line L abuts inverse flow characteristic 1/Ψ as a tangent. Straight line L has the following form:

$$L = a + b*\Pi.$$

Straight line L is now inserted into the throttle equation. In addition, the following effects are intentionally disregarded, due to their limited influence during the transition from the throttle control to the boost pressure control, and the corresponding terms have been removed from the throttle equation:

$$\frac{V}{\kappa RT_2} \dot{p}_{sr}$$

container dynamic in the intake manifold and $w_{TEV}$ throttle valve leak due to manufacturing tolerance and/or wear.

The mass flow over the valves in the transition region from the throttle control to the boost pressure control is also assumed as a constant $w_{vlv,soll}$.

The throttle equation may this be simplified as follows in order to calculate pseudo setpoint aperture $\tilde{A}_{DK,soll}$ in step S3:

$$\tilde{A}_{DK,soll} = \frac{w_{vlv,soll}}{\sqrt{\frac{2}{RT_1} p_{vd}}} \left( a + b \frac{p_{sr,soll}}{p_{vd}} \right)$$

Value $\tilde{A}_{DK,soll}$ is then subtracted from maximum aperture $A_{DK,max}$ in step S4.

The difference from maximum aperture $A_{DK,max}$ and pseudo setpoint aperture $\tilde{A}_{DK,soll}$ is then entered into a controller as the input variable in step S5 In this specific embodiment, a control variable is determined with the aid of a PI controller in step S5. The output of the I element is limited to a maximum value in such a way that a constantly positive input variable does not result in a constantly increasing controller response. In other words: As long as pseudo setpoint aperture $\tilde{A}_{DK,soll}$ is smaller than maximum aperture $A_{DK,max}$, an accumulation of the controller output is prevented. This anti-windup function prevents an overflowing control variable as well as a long response time at the moment of the transition from the throttle control to the boost pressure control. In the first specific embodiment, a stop, which is not illustrated, limits the mechanism for adjusting the turbine geometry as a securing function. Turbine 9 may therefore be controlled below a minimal drive. An accumulation of the I element would thus not result in a readjustment of turbine 9.

After step S5, control variable $r_{Gov}$ is continuously output to the drive unit of turbine 9. The drive unit sets turbine 9 according to transmitted variable $r_{Gov}$ in step S6. A corresponding boost pressure $p_{vd,ist}$ is obtained as the result of step S6.

Boost pressure $p_{vd,ist}$ upstream from the throttle valve and setpoint intake manifold pressure $p_{sr,soll}$, together with charge air temperature $T_1$ and the setpoint mass flow in combustion chambers 7 $w_{vlv,soll}$ are the variables for redetermining pseudo setpoint aperture $\tilde{A}_{DK,soll}$ according to the above formula in step S3.

Setpoint intake manifold pressure $p_{sr,soll}$ determined in step S2 is also used in a step S7. In step S7, a corresponding aperture ASK is calculated from setpoint intake manifold pressure $p_{sr,soll}$. This value is limited in absolute terms to the maximum aperture of throttle valve 5, so that the possibly limited variable $A_{DK,lim}$ is output as a control signal. In a subsequent step S8, the throttle valve drive actuates throttle valve 5 according to value $A_{DK,lim}$, and a corresponding intake manifold pressure $p_{sr,ist}$ sets in.

If internal combustion engine 1 is operated in the lower power range, an intake manifold pressure $p_{sr}$ in intake manifold 6 is sufficient, which does not exceed the basic boost pressure minus a throttling loss of throttle valve 5. Since the basic boost pressure in charge air line 4 is sufficient to generate the requested torque $M_{soll}$ in internal combustion chambers 7, a greater drive of turbine 9 is not necessary as the minimal drive. Step S7 thus regulates the power of internal combustion engine 1 with the aid of value $A_{DK,lim}$. Pseudo setpoint aperture $\tilde{A}_{DK,soll}$ determined in step S3 is smaller than maximal aperture $A_{DK,max}$. Step S5 therefore yields only control signal $r_{Gov}$ having a minimal absolute value. In other words, internal combustion engine 7 is operated with the aid of the throttle control.

If internal combustion engine 1 is to output more power, it will enter the overtravel range. The internal combustion engine thus enters the power range, in which the intake manifold pressure must reach the basic boost pressure. Step S7 therefore outputs control variable $A_{DK,lim}$ with the maximum absolute value, and throttle valve 5 is opened all the way. In addition, pseudo setpoint aperture $\tilde{A}_{DK,soll}$ ascertained in steps S3 corresponds to maximum aperture $A_{DK,max}$. In step S5, the controller therefore outputs only control signal $r_{Gov}$ with a minimal absolute value. In other words, internal combustion engine 7 is still operated with the aid of the throttle control.

If the power demand on internal combustion engine 1 further increases, the calculation in step S7 continues to output control variable $A_{DK,lim}$ with a maximum absolute value. At the same time pseudo setpoint aperture $\tilde{A}_{DK,soll}$ exceeds maximum aperture $A_{DK,max}$ with an absolute value. In step S5, the controller therefore outputs control signal $r_{Gov}$ with an increasing absolute value. In other words, internal combustion engine 7 is operated with the aid of the boost control.

This avoids a situation, in which the boost control enters into competition with the throttle control, so that throttle valve 5 would have to decrease an elevated boost pressure. An increased fuel consumption therefore does not occur with the method according to the invention.

FIG. 4b again illustrates the difference, based on a variant of the first specific embodiment compared to FIG. 4a. Only differences from the first specific embodiment are described. In both cases, a setpoint intake manifold pressure $p_{sr,soll}$ is requested at point in time to, which exceeds the basic boost pressure. The profiles of setpoint intake manifold pressure $p_{sr,soll}$, intake manifold pressure psi- and boost pressure $p_{vd}$ are shown in the top diagram in each case. In the diagram second from the top, the resulting profile of $r_{Gov}$ is illustrated as a change signal to the drive unit of turbine 9. The controller in step S5, i.e., in the method according to the invention, was a prototype with a highly variable behavior in this test; cf. FIG. 4b. In the third diagram from the top, the advantageous effect of the invention is apparent. In the case of the control according to the prior art, a boost pressure $p_{vd}$ above setpoint intake manifold pressure $p_{sr,soll}$ is generated; cf. FIG. 4a; the aperture of throttle valve 5 is therefore reduced, so that more fuel is consumed. In the case of the control according to the invention, throttle valve 5 may remain open; cf. FIG. 4b; no unnecessary increased consumption is therefore induced. Starting at $t_0$, the fourth diagram shows a similar acceleration behavior of internal combustion engine 1; i.e., the method according to the invention does not come at the cost of vehicle dynamics.

A further variant of the first specific embodiment is not illustrated in the figures. In step S5, a PID controller is used instead of a PI controller to achieve a more rapid response.

Figure 5:
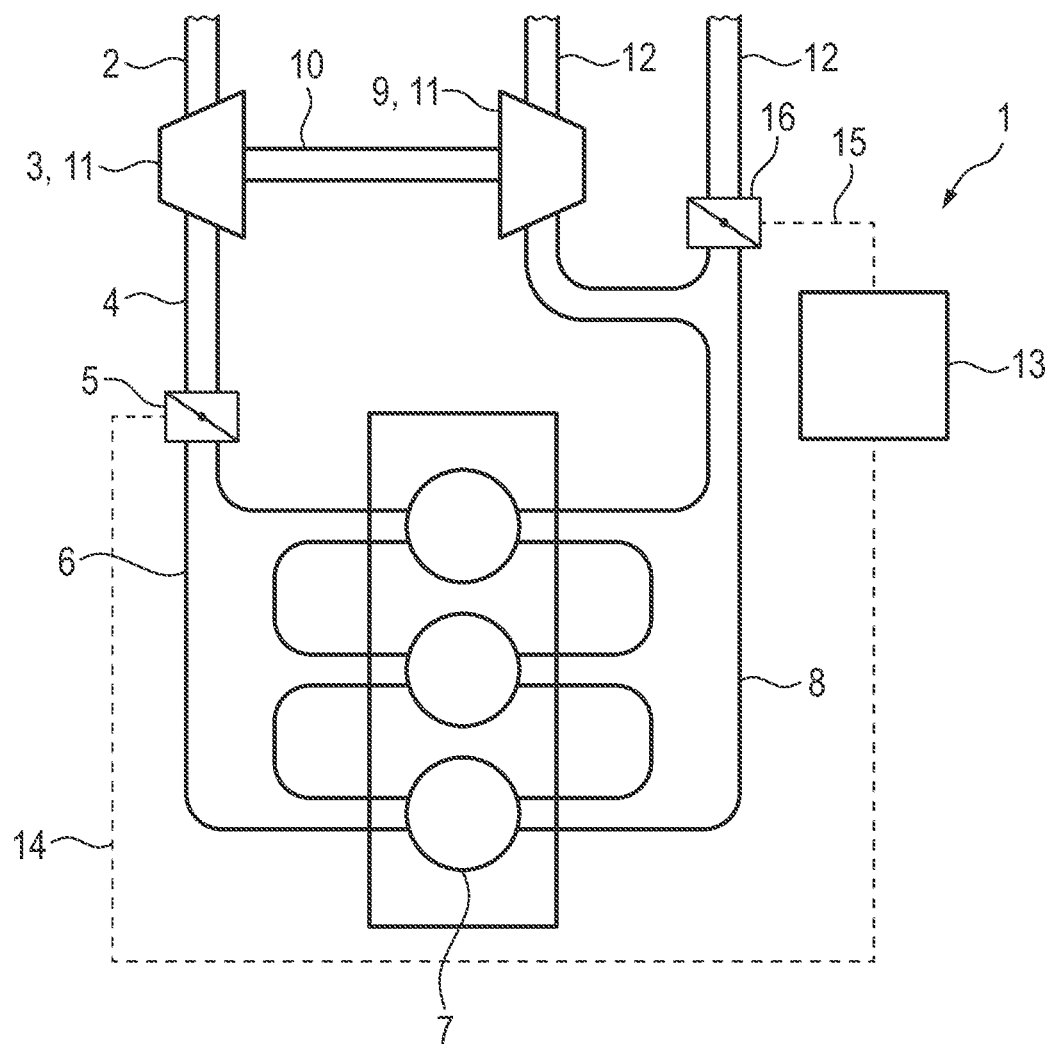
FIG. 5 schematically shows an internal combustion engine according to a second example.

A second example of the invention is shown in FIG. 5. It corresponds to the first specific embodiment, with the exception of turbine 9. Instead of a turbine 9 having a variable geometry, a turbine 9 having an invariable geometry is used, and a wastegate valve 16 is connected upstream from turbine 9. If necessary, turbine 9 may be short-circuited, for example, with the aid of wastegate valve 16. In the second specific embodiment, turbine 9 is therefore driven with the aid of wastegate valve 16. The illustrated method changes only in terms of absolute value.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for activating a boost pressure control for an internal combustion engine, which comprises, in a through-flow direction, a compressor, a charge air line, a throttle valve, an intake manifold, at least one combustion chamber, and a turbine speed-coupled to the compressor, an aperture of the throttle valve being controllable, a driving of the turbine being controllable by an exhaust gas flow, the method comprising:
   predefining a setpoint intake manifold pressure;
   calculating a simplified inverse flow characteristic of the throttle valve;
   calculating a pseudo setpoint aperture of the throttle valve based on the simplified inverse flow characteristic and the setpoint intake manifold pressure; and
   controlling the driving of the turbine based on an exceeding of a maximum aperture of the throttle valve by the pseudo setpoint aperture of the throttle valve.

2. The method according to claim 1, wherein the calculation of the simplified inverse flow characteristic includes: linearizing an inverse flow characteristic in a working point.

3. The method according to claim 2, wherein the working point is selected such that a quotient of the intake manifold pressure in relation to the boost pressure is in a range from 0.90 to 0.995.

4. The method according to claim 1, wherein the control of the driving is based on a difference from the maximum aperture and the pseudo setpoint aperture and includes limiting a control variable for the case that when the pseudo setpoint aperture is smaller than the maximum aperture.

5. A method for controlling a throttle valve comprising:
   activating a boost pressure control according to claim 1;
   controlling an aperture of the throttle valve based on a setpoint intake manifold pressure; and
   limiting a control response to the maximum aperture.

6. A non-transitory computer-readable storage medium storing a computer program thereon that, when executed by a computer, causes the computer to perform the method according to claim 1.

7. A control unit communicatively connectable to a turbocharger drive unit or additionally to a throttle valve drive unit, the control unit being adapted to perform the method according to claim 1.

8. A rechargeable internal combustion engine comprising
   a compressor;
   a charge air line;
   a throttle valve;
   an intake manifold;
   a combustion chamber;
   a turbine speed-coupled to the compressor; and
   a control unit according to claim 7,
   wherein, in a through-flow direction, an aperture of the throttle valve is controllable via the control unit, and
   wherein a driving of the turbine is controllable by an exhaust gas flow.

9. A vehicle, comprising the internal combustion engine according to claim 8.

* * * * *